(12) United States Patent
Perrin et al.

(10) Patent No.: US 12,155,406 B2
(45) Date of Patent: Nov. 26, 2024

(54) ENVELOPE DETECTION (71) Applicants: STMicroelectronics (Grenoble 2) SAS, Grenoble (FR); STMicroelectronics (Alps) SAS, Grenoble (FR)

(72) Inventors: Danika Perrin, Jarrie (FR); Sandrine Nicolas, Saint Egreve (FR)

(73) Assignees: STMicroelectronics (Grenoble 2) SAS, Grenoble (FR); STMicroelectronics (Alps) SAS, Grenoble (FR)

( * ) Notice: Subject to any disclaimer, the term of this patent is extended or adjusted under 35 U.S.C. 154(b) by 175 days.

(21) Appl. No.: 17/881,749

(22) Filed: Aug. 5, 2022

(65) Prior Publication Data

US 2023/0056937 A1 Feb. 23, 2023

(30) Foreign Application Priority Data

Aug. 19, 2021 (FR) ...................................... 2108777

(51) Int. Cl.
*H03K 9/00* (2006.01)
*H04B 1/16* (2006.01)
(52) U.S. Cl.
CPC .................. *H04B 1/1615* (2013.01)
(58) Field of Classification Search
CPC ............................... H04B 1/1615; H04B 1/16
USPC ........................................................ 375/316
See application file for complete search history.

(56) References Cited

U.S. PATENT DOCUMENTS

| 5,978,664 | A | * | 11/1999 | Janssen | ................ | H04B 17/318 |
| | | | | | | 455/226.2 |
| 7,839,210 | B2 | * | 11/2010 | Bas | ......................... | H03D 1/00 |
| | | | | | | 329/347 |
| 9,209,892 | B2 | * | 12/2015 | Perre | .................... | H03G 3/3078 |
| 9,601,995 | B1 | | 3/2017 | Mukherjee et al. | | |
| 2008/0169873 | A1 | * | 7/2008 | Toda | ........................ | H03D 1/18 |
| | | | | | | 329/369 |
| 2015/0155834 | A1 | * | 6/2015 | Ripley | .................. | H04W 88/02 |
| | | | | | | 330/279 |
| 2019/0190450 | A1 | | 6/2019 | Ikeda et al. | | |

FOREIGN PATENT DOCUMENTS

EP 3664286 A1 6/2020

* cited by examiner

*Primary Examiner* — Helene E Tayong
(74) *Attorney, Agent, or Firm* — Slater Matsil, LLP (57) ABSTRACT

In an embodiment an envelope detection device includes an input terminal configured to receive an amplitude-modulated radio frequency signal, a first resistive element and a first MOS transistor connected in parallel between the input terminal and a first node configured to receive a reference potential, a first capacitive element connected between a gate of the first MOS transistor and the first node, an envelope detection circuit connected to the input terminal and configured to supply a voltage representative of an envelope of the amplitude-modulated signal and a circuit for controlling the first MOS transistor configured to supply a first current to the gate of the first MOS transistor only when the voltage is smaller than a first threshold and draw a second current from the gate of the first MOS transistor only when the voltage is higher than a second threshold, the second threshold being higher than the first threshold.

20 Claims, 5 Drawing Sheets

ENVELOPE DETECTION

CROSS-REFERENCE TO RELATED APPLICATIONS

This application claims the benefit of French Application No. 2108777, filed on Aug. 19, 2021, which application is hereby incorporated herein by reference.

TECHNICAL FIELD

The present disclosure generally concerns electronic circuits and, more particularly, devices for detecting the envelope of an amplitude-modulated signal.

BACKGROUND

The receivers of an amplitude-modulated radiofrequency signal are known. For example, the radio frequency signal is modulated in OOK ("On Off Keying"). For example, the radio frequency signal has a frequency in the range from 100 kHz to 10 GHz.

To obtain the data transmitted via the amplitude modulation of the radio frequency signal, these known radio frequency receivers comprise an envelope detection device. The aim of envelope detection is to supply a signal representative of the envelope of the amplitude-modulated radio frequency signal, this signal being representative of the transmitted data.

SUMMARY

Embodiments provide envelope detection devices. Various embodiments provide envelope detection devices that overcome all or part of the disadvantages of known envelope detection devices, for example, when these envelope detection devices are implemented in a receiver of a wireless amplitude-modulated radio frequency signal.

An embodiment provides an envelope detection device comprising: an input terminal configured to receive an amplitude-modulated radio frequency signal; a resistive element and a first MOS transistor connected in parallel between the input terminal and a first node configured to receive a reference potential;
a first capacitive element connected between the gate of the first MOS transistor and the first node;
an envelope detection circuit connected to the input terminal and configured to supply a voltage representative of the envelope of the amplitude-modulated signal; and a circuit for controlling the first MOS transistor configured to:
  supply a first current to the gate of the first MOS transistor only when said voltage is smaller than a first threshold; and
  draw a second current from the gate of the first MOS transistor only when said voltage is higher than a second threshold higher than the first threshold.

According to an embodiment, a gain of the envelope detection circuit is equal to K times the square of the signal.

According to an embodiment, the envelope detection circuit has a negative gain.

According to an embodiment, the control circuit comprises:
a first circuit configured to supply the first current to the gate of the first MOS transistor only when said voltage is smaller than the first threshold; and
a second circuit configured to draw the second current from the gate of the first MOS transistor only when said voltage is higher than the second threshold.

According to an embodiment, the second circuit is further configured to supply a third current to the gate of the first MOS transistor only when said voltage is smaller than the second threshold.

According to an embodiment, the third current is of the same order as the second current, for example, equal to the second current.

According to an embodiment, the first current is at least 10 times greater than the second current.

According to an embodiment, the control circuit further comprises a switch connected in parallel with the first capacitive element.

According to an embodiment, the first circuit comprises:
  a first differential pair having a first input configured to receive said voltage and a second input configured to receive the first threshold;
  a first current source configured to bias the first differential pair; and
  at least one first current mirror configured to supply the first current to the gate of the first transistor from a current flowing through the first differential pair when said voltage is smaller than the first threshold,
wherein the second circuit comprises:
  a second differential pair comprising a first input configured to receive said voltage and a second input configured to receive the second threshold;
  a second current source configured to bias the second differential pair;
  at least one second current mirror configured to draw the second current from the gate of the first transistor from a current flowing through the second differential pair when said voltage is higher than the second threshold; and
  at least one third current mirror configured to supply the third current to the gate of the first transistor from a current flowing through the second differential pair when said voltage is smaller than the second threshold.

According to an embodiment, the first circuit comprises:
  a first differential pair having a first input configured to receive said voltage and a second input configured to receive the first threshold;
  a first current source configured to bias the first differential pair; and
  at least one first current mirror configured to supply the first current to the gate of the first transistor from a current flowing through the first differential pair when said voltage is smaller than the first threshold,
wherein the second circuit comprises:
  a second differential pair comprising a first input configured to receive said voltage and a second input configured to receive the second threshold;
  a second current source configured to bias the second differential pair; and
  at least one second current mirror configured to draw the second current from the gate of the first transistor from a current flowing in the second differential pair when said voltage is higher than the second threshold.

According to an embodiment, the first current is of the same order as the second current, for example, equal to the second current.

According to an embodiment, the envelope detection circuit comprises:
  a MOS transistor having a first conduction terminal coupled to said input terminal;

a voltage source configured to apply a constant bias voltage to the gate of the MOS transistor of the envelope detection circuit; and a capacitive element and a resistive element connected in parallel between a second conduction terminal of the MOS transistor of the envelope detection circuit and a second node configured to receive a power supply potential.

According to an embodiment, the second conduction terminal of the MOS transistor of the detection circuit is coupled, preferably connected, to an output of the envelope detection circuit, said output being configured to deliver said voltage.

An embodiment provides a wake up radio frequency receiver comprising a device such as described.

According to an embodiment, the receiver further comprises:

an antenna for receiving a radio frequency signal; and
an impedance matching network coupling said antenna to the input terminal of the envelope detection device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, usual techniques for recovering the data transmitted via an amplitude-modulated signal, from the envelope of the radio frequency signal, have not been detailed, the described embodiments being compatible with these usual techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Unless specified otherwise, in the rest of the description, the currents are positive. In other words, unless specified otherwise, a circuit which draws a current from a node means that this current is positive and flows from the node to the circuit drawing it. Similarly, unless specified otherwise, a circuit which supplies a current to a node means that this current is positive and flows from this circuit to the node to which it is supplied.

When a radio frequency receiver receives a radio frequency signal on its antenna, this signal is transmitted, for example, by an impedance matching network and/or a filter, to an input of a first stage of the radio frequency receiver, for example, to an input of an envelope detection device.

The radio frequency signal received by the first stage of the receiver corresponds to an amplitude-modulated radio frequency signal, also called useful signal, having possible interference radio frequency signals superimposing thereto. The peak-to-peak amplitude of the useful signal supplied to the input of the first stage may strongly vary, for example, it may be in the range from 2 mV to 3.5 V, for example, according to conditions of transmission of the useful signal between a transmitter and the receiver of the useful signal such as, for example, the distance between the transmitter and the receiver.

Further, the peak-to-peak amplitude of the interference signals present on the input of the first stage may be much greater than that of the useful signal. For example, the power of the interference signals is up to +30 dB greater than that of the useful signal.

A way to recover the data transmitted via the useful signal comprises generating a voltage representative of the envelope of the radiofrequency signal present on the input of the first stage, that is, a voltage having its level varying with the amplitude variations of the envelope of the radio frequency signal. However, the difference between the high and low levels of the voltage representative of the envelope should be sufficiently large to be able to identify when the voltage is at a low level and when the voltage is at a high level, to recover the amplitude modulation of the useful signal and thus the data transmitted via this useful signal.

The strong variations of the peak-to-peak amplitude of the useful signal received by the first stage of a radio receiver and the possible presence of interference signals raise issues. For example, too high a peak-to-peak amplitude of the useful signal may raise saturation issues and/or the presence of interference signals may prevent the proper decoding of the useful signal.

Further, generally, it is desirable for these radio frequency receivers to consume little power, in particular when they are implemented in embarked applications powered with a battery. This is for example particularly true for radio frequency receivers called wake up radio receivers, WuR, which are configured to detect, over a radio frequency band of interest, whether a wake up signal is transmitted. Indeed, these wake up receivers continuously listen to or observe the band of interest while waiting for this wake up signal.

A particularly low-power consuming envelope detection device is here provided. Further, the provided envelope detection device implements an automatic gain control (AGC) function. This automatic gain control function enables to supply an envelope signal, that is, a voltage representative of the envelope of the amplitude-modulated radio frequency signal, having a high level and a low level sufficiently different to be able to recover the data transmitted via the useful signal, while avoiding for this voltage representative of the envelope to saturate due to the variations of the peak-to-peak amplitude of the useful signal and/or to the presence of interference signals on the input of the envelope detection device.

The envelope detection device provided herein is for example particularly adapted to being the first stage of a radio frequency receiver, that is, the first active stage of the receiver after the antenna, the possible impedance matching network and/or the possible band-pass filter coupling the antenna to the input of the envelope detection device.

According to an embodiment, the provided envelope detection device comprises a MOS ("metal oxide semiconductor") transistor, for example with an N channel (NMOS), assembled with a common source on the input of the envelope detection device, and an envelope detection circuit. The automatic gain control function is implemented due to the MOS transistor which enables to decrease the power of the signal on the input of the device by drawing current from the input of the device, thus enabling to avoid a saturation of the detection circuit. The control of the gate voltage of the MOS transistor is implemented by a transistor control circuit, based on a comparison of the output voltage of the envelope detection circuit with a first threshold and on a comparison of this same voltage with a second threshold. The results of these two comparisons determine the current that the MOS transistor should draw from the input of the envelope detection device by accordingly adapting the control of the MOS transistor. This enables to set the peak-to-peak amplitude of the signal on the input of the envelope detection device to a value such that the envelope detection circuit does not saturate.

According to an embodiment, a gain of the envelope detection circuit is equal to K times the square of the average peak-to-peak amplitude of the signal on the input of the envelope detection device. Thus, when the average peak-to-peak amplitude of the useful signal on the input of the device is small, the envelope of the signal on the input of the device is however sufficiently amplified for the high and low levels of the output voltage of the detector to be sufficiently distant from each other.

Figure 1:
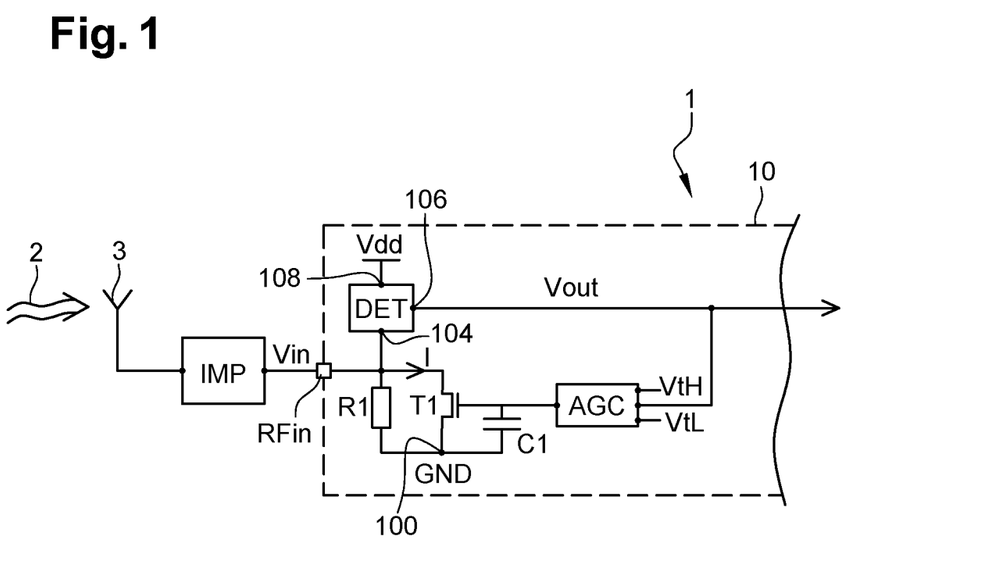
FIG. 1 schematically shows an embodiment of a radio frequency receiver.

FIG. 1 schematically shows an embodiment of a radio frequency receiver 1 (partially shown in FIG. 1), and more particularly an embodiment of an envelope detection device 10 of this receiver 1. Preferably, receiver 1 is a wake up or activation radio frequency receiver.

Receiver 1 is a wireless receiver of an amplitude-modulated radio frequency signal 2, for example, according to an OOK modulation.

Receiver 1 comprises an antenna 3 configured to receive radio frequency signal 2. In the example of FIG. 1, the antenna is coupled to an input RFin of device 10 by an optional impedance matching network IMP. In another example, not illustrated, a filter is provided between antenna 3 and input RFin, associated or not with network IMP. Device 10 thus forms the first active stage of radio frequency receiver 1.

The input RFin of device 10 is configured to receive an amplitude-modulated radio frequency signal Vin. Indeed, when a radio frequency transmitter (not shown in FIG. 1) transmits an amplitude-modulated radio frequency signal for receiver 1, this useful signal Vut is present in signal Vin. Further, interference signals Vint received by antenna 3 may superimpose to useful signal Vut in signal Vin. Thus, signal Vin is equal to the sum of the useful signal Vut and of interference signals Vint.

Device 10 comprises a resistive element R1 and a MOS transistor T1 connected in parallel, between input terminal RFin and a node 100. Resistive element R1 for example enables to implement an impedance matching on input RFin. The MOS transistor has an N channel (NMOS). Node 100 is configured to receive a reference potential GND, for example, the ground potential. As an example, the source of transistor T1 is coupled, preferably connected, to node 100, the drain of transistor T1 being coupled, preferably connected, to terminal RFin.

Device 10 comprises a capacitive element C1 coupling the gate of transistor T1 to node 100. For example, a first electrode of capacitive element C1 is coupled, preferably connected, to node 100, a second electrode of capacitive element C1 being coupled, preferably connected, to the gate of transistor T1.

Device 10 comprises an envelope detection circuit DET. Circuit DET is connected to terminal RFin. As an example, circuit DET comprises an input 104 connected to terminal RFin. Circuit DET is configured to deliver a voltage Vout representative of the envelope of signal Vin, that is, an envelope signal Vout. As an example, voltage Vout is available on an output 106 of circuit DET.

Preferably, circuit DET is also connected to a node 108 configured to receive a power supply potential Vdd, for example, positive and referenced to potential GND. Circuit DET is then in series with the parallel association of transistor T1 and of resistive element R1, between nodes 108 and 100.

According to an embodiment, the gain of circuit DET is proportional to the square of the peak-to-peak amplitude of signal Vin. In other words, the gain is equal to K*Vin2, K being a proportionality coefficient. Thus, even when the average peak-to-peak amplitude of useful signal Vut is low, for example in the order of 2 mV peak-to-peak, the peak-to-peak amplitude of voltage Vout is sufficient to be processed by a processing circuit (not shown in FIG. 1) of receiver 1, this processing circuit being particularly configured to sample voltage Vout, for example, over one bit.

According to an embodiment, the gain of circuit DET is negative. In other words, in an embodiment where the gain of circuit DET is equal to K*Vin2, proportionality coefficient K is negative.

Device 10 further comprises an AGC circuit for controlling transistor T. The AGC circuit and MOS transistor T1 implement an automatic gain control function, based on comparisons of voltage Vout with two thresholds VtL and VtH. More particularly, according to the result of the comparisons of voltage Vout with threshold VtL and VtH, the AGC circuit controls transistor T1 to adapt the current I drawn by transistor T1 from input RFin, so as to adapt the power of signal Vin in such a way that circuit DET does not saturate.

The AGC circuit is configured to supply a current I1 (not shown in FIG. 1) to the gate of the MOS transistor, only when voltage Vout is smaller than threshold VtL. Thus, when voltage Vout is smaller than threshold VtL, current I1 charges capacitive element C1, which results in an increase in the gate-source voltage of transistor T1, and thus in an increase in the current I drawn by transistor T1 from terminal RFin. The increase in current I causes a decrease in the power of signal Vin, which enables to avoid the saturation of circuit DET. In other words, the AGC circuit is configured to increase the gate-source voltage of transistor T1 when the power of signal Vin exceeds a first threshold, the detection that the power of signal Vin exceeds this first threshold being implemented by comparing voltage Vout with threshold VtL, and, more particularly, for example, by detecting that voltage Vout is smaller than threshold VtL.

The supply of current I1 to the gate of transistor T1 thus enables to avoid a saturation of circuit DET, for example, on occurrence of interference signals Vint which superimpose to useful signal Vut in signal Vin, which have a peak-to-peak amplitude greater than the peak-to-peak amplitude of the amplitude-modulated useful signal, for example, when the power of signals Vint is greater by up to 30 dB than that of signal Vut.

The AGC circuit is further configured to draw a current I2 from the gate of transistor T1 only when voltage Vout is higher than a threshold VtH, threshold VtH being higher than threshold VtL. This enables device 10 to modify the peak-to-peak voltage of signal Vin, that is, the power of signal Vin, to maximize the peak-to-peak amplitude of voltage Vout without causing a saturation of circuit DET, for example, especially when signal Vin comprises no interference signals Vint having a power greater, for example, greater by up to 30 dB, than that of useful signal Vut. In other words, the AGC circuit is configured to decrease the gate-source voltage of transistor T1 when the power of signal Vin is smaller than a first threshold, the detection that the power of signal Vin is smaller than this first threshold being implemented by comparing voltage Vout with threshold VtH, and, more particularly, for example, by detecting that voltage Vout is higher than threshold VtH.

According to an embodiment, to modify the power of signal Vin, circuit AGC is further configured to supply a current I3 to the gate of transistor T1, only when voltage Vout is smaller than threshold VtH. According to an embodiment, current I3 is then of the same order of magnitude than current I2, for example, equal to current I2. In other words, the AGC circuit is configured to increase the gate-source voltage of transistor T1 when the power of signal Vin exceeds a first threshold, the detection that the power of signal Vin exceeds this first threshold being implemented by comparing voltage Vout with threshold VtH, and, more particularly, for example by detecting that voltage Vout is smaller than threshold VtH.

Thus, in the absence of interference signals Vint, the power of signal Vin is maintained at a value determined by threshold VtH, due to the control of transistor T1 by currents I2 and I3.

In such an embodiment, preferably, current I1 is large as compared with current I2, for example, at least 10 times greater than current I2. Thereby, device 10 rapidly reacts to an increase in the peak-to-peak voltage of signal Vin resulting from the occurrence of interference signals Vint.

Preferably, the value of capacitive element C1 is selected to be sufficiently large for currents I2 and I3, respectively drawn from and supplied to the gate of transistor T1, to cause no fast and significant modification of the voltage across element C1 or, in other words, so that in the absence of an abrupt variation of the power of signal Vin resulting from the occurrence of the interference signals, the voltage across capacitive element C1 is substantially constant. As an example, the ratio of current I1 to the capacitance value of element C1, and the ratio of current I3 to the capacitance value of element C1 are smaller than 150.

In such an embodiment, the discharge of capacitance C1 by current I2 is then long as compared with the charge of capacitive element C1 by current I1, which may raise an issue, for example, when signal Vin comprises interference signals Vint which abruptly disappear. Preferably, the AGC circuit then comprises a circuit for resetting the voltage across capacitive element C1. As an example, this reset circuit corresponds to a switch connected in parallel with capacitive element C1. As an example, a resetting of the voltage across the capacitive element is implemented at the beginning of each new frame transmitted via the signal 2 received on the antenna 3 of receiver 1. As an example, the beginning of a frame is identified by detecting that voltage Vout switches from a substantially constant value due to the fact that there is no useful signal Vut on input RFin (absence of a frame), to a value which switches between a high level and a low level due to the fact that there is a useful signal Vut present on input RFin (transmission of a frame via signal 2).

According to another embodiment, to control the power of signal Vin in the absence of interference signals Vint, the AGC circuit is not configured to supply current I3. In such an embodiment, currents I1 and I2 are of the same order of magnitude, preferably are equal. Thus, when voltage Vout is between thresholds VtH and VtL, the voltage on the gate of transistor T1 remains substantially constant. The provision of currents I1 and I2 of the same order of magnitude enables to have a symmetrical behavior regarding the charge and discharge rate of capacitive element C1, and thus a symmetrical behavior on occurrence and at the disappearing of interference signals Vint. In this case, the AGC circuit may comprise no circuit for resetting the voltage across capacitive element C1.

The implementation of device 1, and more particularly of circuits DET and AGC, is within the abilities of those skilled in the art based on the functional indications provided in relation with FIG. 1.

Figure 2:
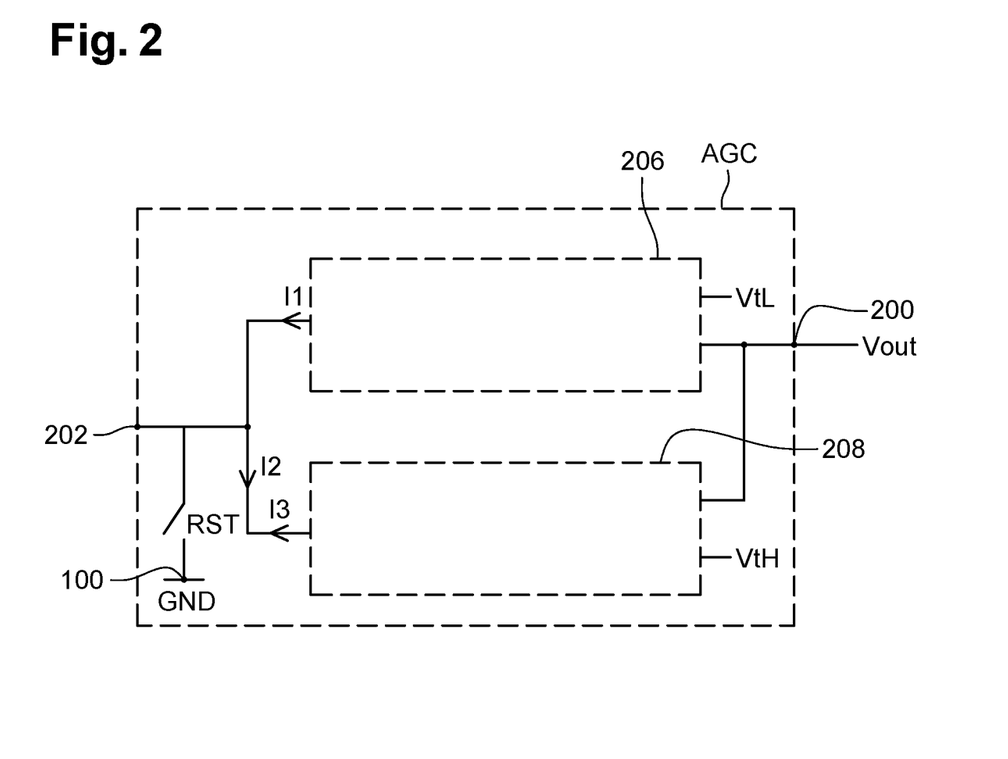
FIG. 2 shows in further detail an example of embodiment of a device of the radio frequency receiver of FIG. 1.

FIG. 2 shows in further detail an example of embodiment of the AGC circuit of the device 10 of FIG. 1.

The AGC circuit comprises an input 200 configured to receive voltage Vout, and an output 202 coupled, preferably connected, to the gate of the transistor T1 of the device 10 of FIG. 1.

In the example of embodiment of FIG. 2, the AGC circuit comprises a circuit 206 and a circuit 208.

Circuit 206 is configured to supply current I1 to output 202, and thus to the gate of transistor T1 (FIG. 1), only when voltage Vout is smaller than threshold VtL.

As an example, circuit 206 comprises an input configured to receive voltage Vout, an input configured to receive threshold VtL, and an output coupled, preferably connected, to output 202. The output of circuit 206 is configured to supply current I1 to output 202, only when voltage Vout is smaller than threshold VtL.

Circuit 208 is configured to draw current I2 from output 202, and thus from the gate of the transistor T1 of FIG. 1, only when voltage Vout is higher than threshold VtH.

As an example, circuit 208 comprises an input configured to receive voltage Vout, an input configured to receive threshold VtH, and an output coupled, preferably connected, to output 202. The output of circuit 208 is configured to draw current I2 from output 202 only when voltage Vout is higher than threshold VtH.

According to an embodiment, as illustrated in FIG. 2, the AGC circuit is further configured to supply current I3 only when voltage Vout is smaller than threshold VtH. As an example, circuit 208 or, in other words, the output of circuit 208, is then also configured to supply current I3 at output 202 only when voltage Vout is smaller than threshold VtH.

Further, according to an embodiment where the AGC circuit is configured to supply current I3 only when voltage Vout is smaller than threshold VtH, the AGC circuit comprises a circuit RST for resetting the voltage across the capacitive element C1 of FIG. 1, for example, a switch RST connected between output 202 and node 100 at potential GND.

In another embodiment, not illustrated, where the AGC circuit does not supply current I3, circuit 208 is then configured to supply or draw no current to or from output 202 when voltage Vout is smaller than threshold VtH. Preferably, the AGC circuit then comprises no circuit RST.

The implementation of circuits 206 and 208 is within the abilities of those skilled in the art based on the functional description made of these circuits in relation with FIG. 2. For example, those skilled in the art are capable of implementing circuits 206 and 208 based on current sources, on switches coupling the current sources to the outputs of circuits 206 and 208, and on comparators configured to compare voltage Vout with thresholds VtL and VtH and to control the switches according to the results of these comparisons.

Figure 3:
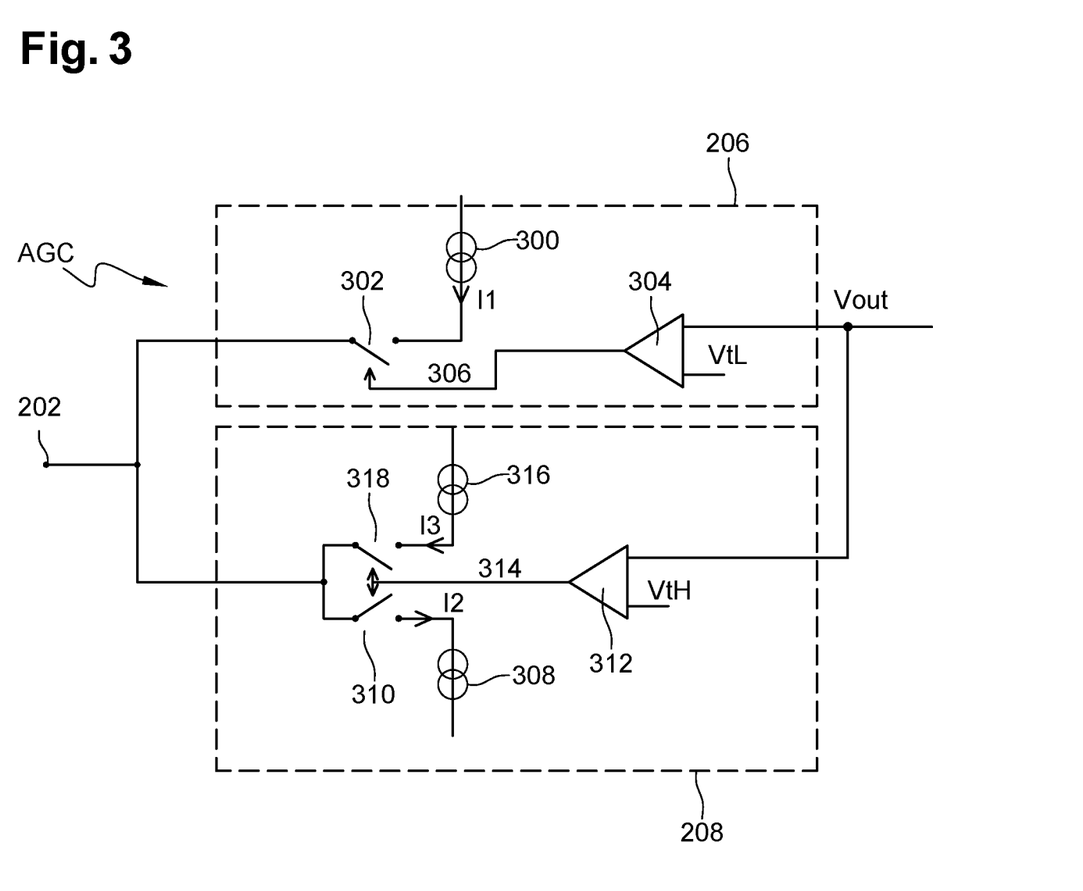
FIG. 3 shows in further detail an example of embodiment of circuits of the device of FIG. 2.

FIG. 3 illustrates an example of embodiment of circuits 206 and 208 based on current sources, on switches, and on comparators controlling the switches.

In this example, circuit 206 comprises a current source 300 supplying current I1, a switch 302 coupling current source 300 to the output of circuit 206, and a comparator 304 configured to supply a binary signal 306 for controlling switch 302. The binary state of signal 306 depends on the result of the comparison of signal Vout with threshold VtL. Comparator 304 is configured to turn on switch 302 when voltage Vout is smaller than threshold VtL, and to turn it off otherwise.

In this example, circuit 208 comprises a current source 308 drawing current I2, a switch 310 coupling current source 308 to the output of circuit 208, and a comparator 312 configured to deliver a binary signal 314 for controlling switch 310. The binary state of signal 314 depends on the result of the comparison of signal Vout with threshold VtH. Comparator 312 is configured to turn on switch 310 when voltage Vout is higher than threshold VtH, and to turn it off otherwise.

In this example, circuit 208 is also configured to supply current I3 to output 202 only when voltage Vout is smaller than threshold VtH. For this purpose, circuit 208 further comprises a current source 316 configured to supply current I3 and a switch 318 coupling current source 316 to the output of circuit 208. Switch 318 is controlled by signal 314. Comparator 312 is configured to turn on switch 318 when voltage Vout is smaller than threshold VtH and to turn it off otherwise.

In another example, not illustrated, circuit 208 does not supply or draw any current when voltage Vout is smaller than threshold VtH. In this case, elements 316 and 318 may be omitted.

It will be within the abilities of those skilled in the art to implement other examples of circuits 206 and 208 based on current sources selectively coupled to the outputs of the circuits by switches controlled by output signals of comparators comparing voltage Vout with thresholds VtL and VtH.

Figure 4:
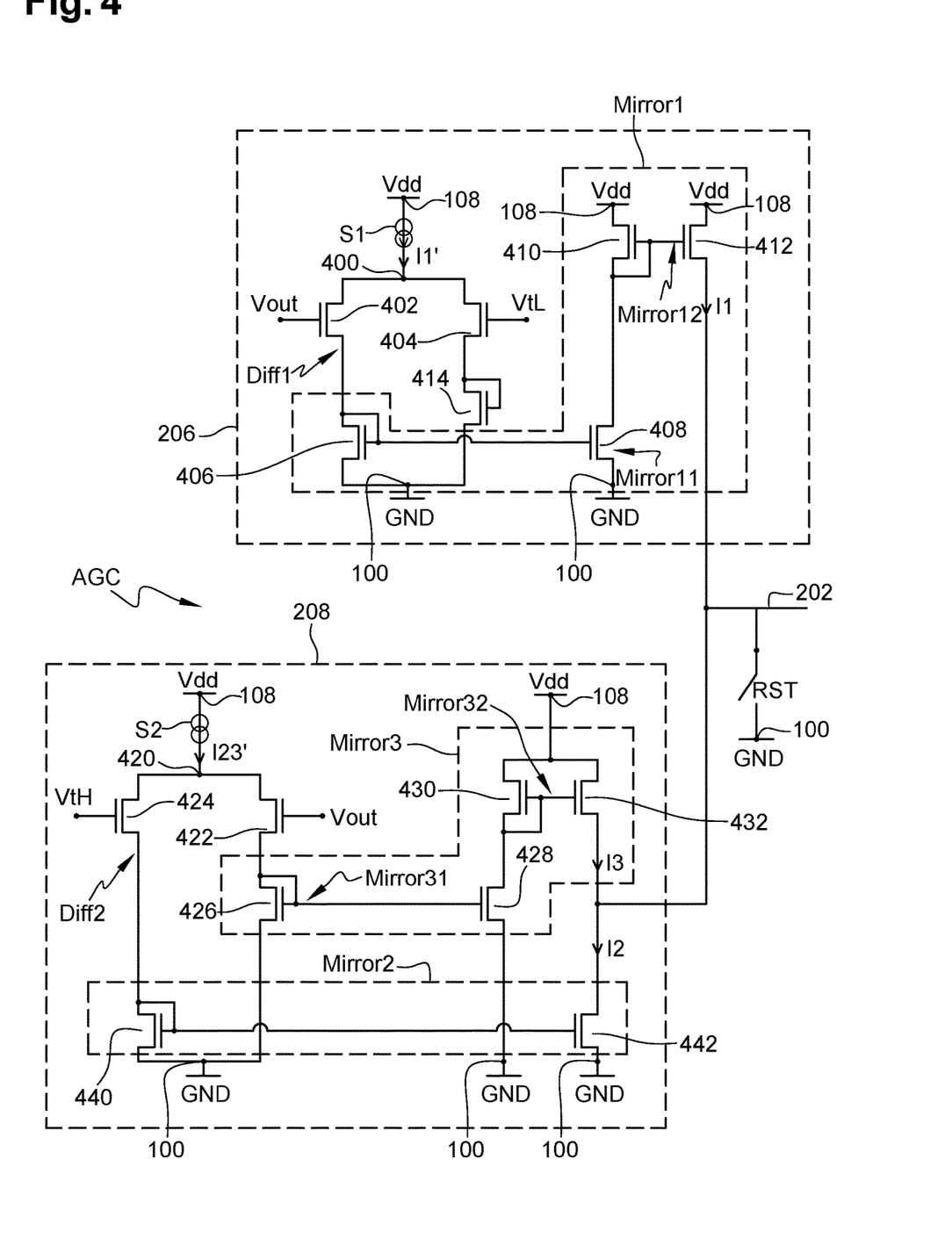
FIG. 4 shows in further detail another example of another embodiment of the device of FIG. 2.

FIG. 4 shows in further detail an example of another embodiment of circuits 206 and 208 of the AGC circuit described in relation with FIG. 2. The embodiment of FIG. 4 corresponds to the case where the AGC circuit is configured to supply current I3 when voltage Vout is smaller than voltage VtH.

In this example of embodiment, circuit 206 comprises a differential pair Diff1, a current source S1 for biasing differential pair Diff1 with a current I1', and at least one current mirror Mirror1.

Differential pair Diff1 is configured to implement the comparison of voltage Vout with threshold VtL. For example, differential pair Diff1 has an input configured to receive threshold VtL and an input configured to receive voltage Vout. More particularly, differential pair Diff1 is configured so that current I1' flows through a first branch of differential pair Diff1 when voltage Vout is smaller than threshold VtL, and through the second branch of the differential pair when voltage Vout is higher than threshold VtL, it being understood that, as well known in differential pairs, a portion of current I1' flows through the second branch when voltage Vout is very close or equal to threshold VtL.

Current mirror(s) Mirror1 are configured to supply current I1 from the current flowing through one of the branches of differential pair Diff1, in this example from the current flowing through the first branch of differential pair Diff1. More particularly, current mirror(s) Mirror1 are configured to supply current I1 at the output of circuit 206, and thus at the output 202 of the AGC circuit. Thus, when voltage Vout is smaller than threshold VtL, for example sufficiently smaller than threshold VtL, the current in the first branch of differential pair Diff1 is equal to current I1' and the current I1 supplied by current mirror(s) Mirror1 is a multiple of current I1' and, when voltage Vout is higher than threshold VtL, the current in the first branch of differential pair Diff1 is zero and the current I1 supplied by current mirror(s) Mirror1 is zero or, in other words, circuit 206 supplies no current I1.

As an example, in FIG. 4, current source S1 is connected between a node 400 and, in this example, node 108 at potential Vdd. In the example of FIG. 4, the first branch of differential pair Diff1 comprises a MOS transistor 402, in this example with a P channel (PMOS), having a source connected to node 400 and a gate configured to receive voltage Vout, the second branch of differential pair Diff1 comprising a MOS transistor 404, in this example with a P channel, having a source connected to node 400 and a gate configured to receive voltage or threshold VtL In this example, the drains of transistors 402 and 404 are coupled to node 100 at potential GND. In this example, circuit 206 comprises two current mirrors Mirror1, respectively bearing references Mirror11 and Mirror12 in FIG. 4. For example, the drain of transistor 402 is coupled to node 100 by a MOS transistor 406 of current mirror Mirror11 further comprising a MOS transistor 408 mirror-assembled with transistor 406. As an example, transistors 406 and 408 have an N channel. Current mirror Mirror12 comprises a MOS transistor 410 in series with transistor 408 between nodes 108 and 100, transistor 408, respectively 410, being on the side of node 100, respectively 108. Current mirror Mirror12 comprises a MOS transistor 412 mirror-assembled with transistor 410 and configured to supply current I1 on the output of circuit 206, and thus on the output 202 of the AGC circuit, transistor 412 being for example connected between node 108 and output 202. As an example, transistors 410 and 412 have a P channel. As an example, the drain of transistor 404 is coupled to node 100 by a diode-assembled MOS transistor 414, for example with an N channel.

In the example of embodiment of FIG. 4, circuit 208 comprises a differential pair Diff2, a current source S2 for biasing differential pair Diff2 with a current I23', at least one current mirror Mirror2, and at least one current mirror Mirror3.

Differential pair Diff2 is configured to implement the comparison of voltage Vout with threshold VtH. For example, differential pair Diff2 has an input configured to receive threshold VtH and an input configured to receive voltage Vout. More particularly, differential pair Diff2 is configured so that current I23' flows through a first branch of differential pair Diff2 when voltage Vout is smaller than threshold VtH, and through the second branch of the differential pair when voltage Vout is higher than threshold VtH, it being understood that, as well known in differential pairs, a portion of current I23' flows through the first branch and the other portion of current I23' flows through the second branch when voltage Vout is very close or equal to threshold VtH.

Current mirror(s) Mirror2 are configured to draw current I2 from the current flowing through one of the branches of differential pair Diff2, in this example from the current flowing through the first branch of differential pair Diff2. More particularly, current mirror(s) Mirror2 are configured to draw current I2 from the output of circuit 208, and thus from the output 202 of the AGC circuit, itself connected to the gate of transistor T1. Thus, when voltage Vout is higher than threshold VtH, the current in the second branch of differential pair Diff2 is equal to current I23' and the current I2 drawn by current mirror(s) Mirror2 is a multiple of current I23'. Conversely, when voltage Vout is smaller than threshold VtH, the current in the second branch of differential pair Diff2 is zero and the current I2 drawn by current mirror(s) Mirror2 is zero or, in other words, circuit 208 draws no current I2.

Current mirror(s) Mirror3 are configured to supply current I3 from the current flowing through one of the branches of differential pair Diff2, in this example from the current flowing through the first branch of differential pair Diff2. More particularly, current mirror(s) Mirror3 are configured to supply current I3 to the output of circuit 208, and thus to the output 202 of the AGC circuit, itself connected to the gate of transistor T1. Thus, when voltage Vout is smaller than threshold VtH, the current in the first branch of differential pair Diff2 is equal to current I23' and the current I3 supplied by current mirror(s) Mirror3 is a multiple of current I23'. Conversely, when voltage Vout is higher than threshold VtH, the current in the first branch of differential pair Diff2 is zero and the current I3 supplied by current mirror(s) Mirror3 is zero or, in other words, circuit 208 supplies no current I3.

As an example, in FIG. 4, current source S2 is connected between a node 420 and, in this example, node 108 at potential Vdd. In the example of FIG. 4, the first branch of differential pair Diff2 comprises a MOS transistor 422, in this example with a P channel, having a source connected to node 420 and a gate configured to receive voltage Vout, the second branch of differential pair Diff2 comprising a MOS transistor 424, in this example with a P channel, having a source connected to node 420 and a gate configured to receive voltage or threshold VtH. In this example, the drains of transistors 422 and 424 are coupled to node 100 at potential GND. In this example, circuit 208 comprises current mirrors Mirror3, respectively bearing references Mirror31 and Mirror32 in FIG. 4, and a single current mirror Mirror2. For example, the drain of transistor 422 is coupled to node 100 by a MOS transistor 426 of current mirror Mirror31 further comprising a MOS transistor 428 mirror-assembled with transistor 426. As an example, transistors 426 and 428 have an N channel. Current mirror Mirror32 comprises a MOS transistor 430 in series with transistor 428 between nodes 108 and 100, transistor 428, respectively 430, being on the side of node 100, respectively 108. Current mirror Mirror32 comprises a MOS transistor 432 mirror-assembled with transistor 430 and configured to supply current I3 on the output of circuit 208, and thus on the output 202 of the AGC circuit, transistor 432 begin for example connected between node 108 and output 202. As an example, transistors 430 and 432 have a P channel. As an example, the drain of transistor 242 is coupled to node 100 by a MOS transistor 440 of current mirror Mirror2. Current mirror Mirror2 comprises a MOS transistor 442 mirror-assembled with transistor 440 and configured to draw current I2 from the output of circuit 208, and thus from the output 202 of the AGC circuit, transistor 442 being for example connected between node 100 and output 202. As an example, transistors 440 and 442 have an N channel.

Although, in the example of FIG. 4, the current source S1 of circuit 206 is connected between nodes 108 and 400 and transistors 402 and 404 have a P channel, it will be within the abilities of those skilled in the art to implement circuit 206 when current source S1 is connected between nodes 100 and 400, and transistors 402 and 404 have an N channel and have their drains coupled to node 108. More particularly, in this case, the first branch of differential pair Diff1 comprises transistor 404, the second branch of differential pair Diff1 comprises transistors 402. Further, the drain of transistor 404 is then coupled to node 108 by current mirror(s) Mirror1 which are accordingly modified to supply current I1 from the current in the first branch of the differential pair when voltage Vout is smaller than threshold VtL, particularly by providing for the drain of transistor 404 to be coupled to node 108 by a MOS transistor of a current mirror Mirror1, and for this to no longer be the case for transistor 402.

Although in the example of FIG. 4, the current source S2 of circuit 208 is connected between nodes 108 and 420 and transistors 422 and 424 have a P channel, it will be within the abilities of those skilled in the art to implement circuit 208 when current source S2 is connected between nodes 100 and 420, and transistors 422 and 424 have an N channel and have their drains coupled to node 108. More particularly, in this case, the first branch of differential pair Diff2 comprises transistor 424, the second branch of differential pair Diff2 comprises transistor 422. In this case, the drain of transistor 424 is coupled to node 108 by current mirror(s) Mirror3, which are accordingly modified to supply current I3 from the current in the first branch of differential pair Diff2 when voltage Vout is smaller than threshold VtH, and the drain of transistor 422 is coupled to node 108 by current mirror(s) Mirror2 which are accordingly modified to draw current I2 from the current in the second branch of differential pair Diff2 when voltage Vout is higher than threshold VtH.

Figure 5:
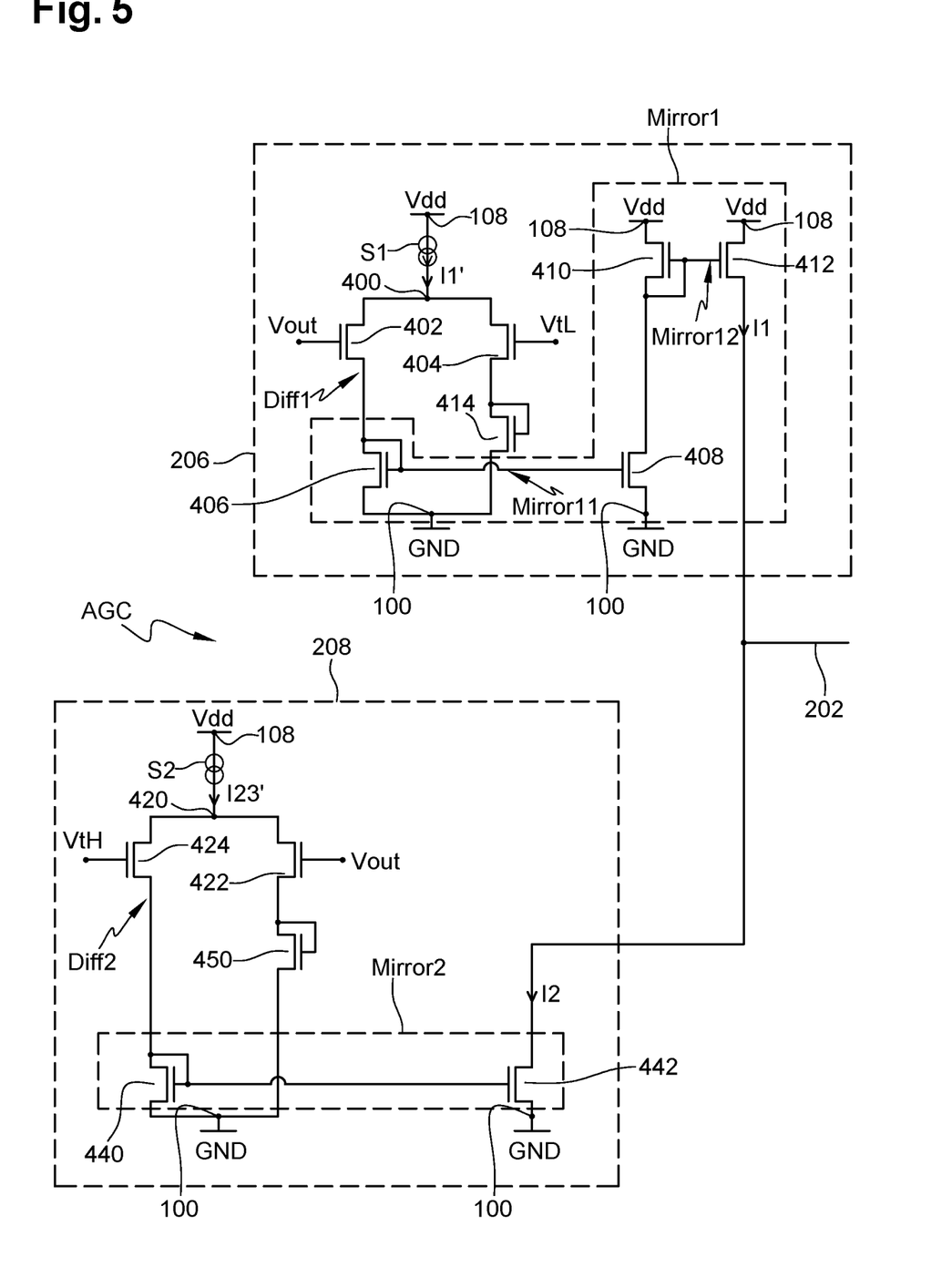
FIG. 5 shows in further detail an example of another embodiment of circuits of the device of FIG. 2.

FIG. 5 shows in further detail an example of still another embodiment of the circuits 206 and 208 of the ACG circuit described in relation with FIG. 2. Only the differences between FIGS. 4 and 5 are here highlighted.

The embodiment of FIG. 5 corresponds to the case where the AGC circuit is configured not to supply current I3 when voltage Vout is smaller than threshold VtH.

Thus, the circuit 208 of FIG. 5 comprises no current mirror Mirror3. In the example of FIG. 5, the drain of transistor 422 is coupled to node 100 by a diode-assembled MOS transistor 450.

Further, switch RST is absent from the AGC circuit of FIG. 5.

Similarly to what has been indicated in relation with FIG. 4, it will be within the abilities of those skilled in the art, based on the examples of circuits 206 and 208 illustrated in FIG. 5, to implement circuit 206 when current source S1 is connected between nodes 100 and 400 and transistors 402 and 404 have an N channel and/or circuit 208 when current source S2 is connected between nodes 100 and 420 and transistors 422 and 424 have an N channel.

Figure 6:
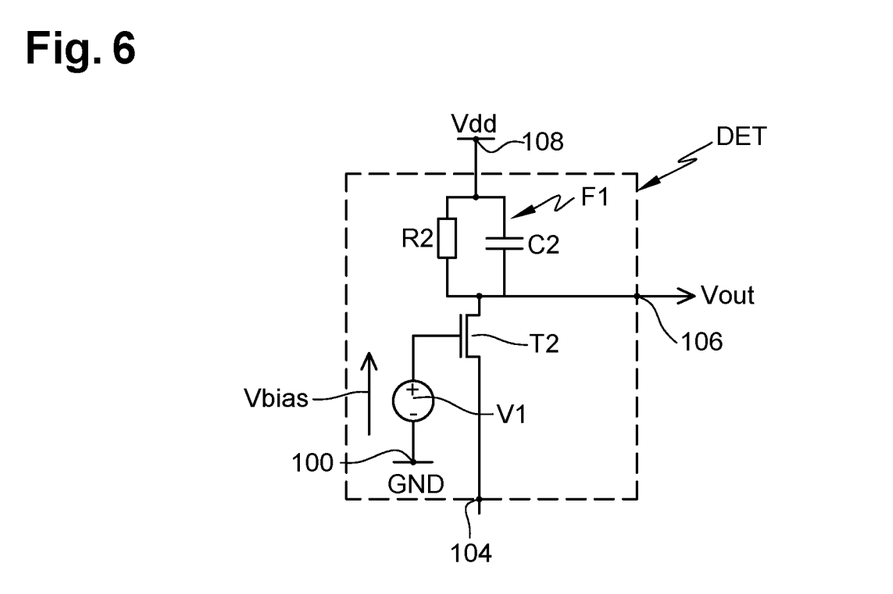
FIG. 6 shows an example of embodiment of a circuit of the radio frequency receiver of FIG. 1.

FIG. 6 illustrates an example of embodiment of the circuit DET described in relation with FIG. 1.

In FIG. 6, circuit DET comprises a MOS transistor T2, a voltage source V1, and a filter F1.

Transistor T2, for example with an N channel, has a first conduction terminal, for example, its source, coupled, preferably connected, to the input terminal 104 of circuit DET, and thus to the input terminal RFin of device 10 (FIG. 1). A second conduction terminal of transistor T2, for example, its drain, is configured to deliver voltage Vout, this second conduction terminal being coupled, preferably connected, to the output 106 of circuit DET and, further, coupled to node 108 by filter F1.

Voltage source V1 is configured to deliver a constant voltage Vbias to the gate of transistor T2. For example, voltage source V1 has a first terminal coupled, preferably connected, to the gate of transistor T2, and a second terminal coupled, preferably connected, to node 100 configured to receive potential GND.

Filter F1 couples output 106 to node 108 configured to receive potential Vdd or, in other words, filter F1 couples the second conduction terminal of transistor T2 to node 108. Filter F1 is a low-pass filter, configured to suppress high frequencies and only keep low frequencies, that is, the envelope of the useful signal.

In the example of FIG. 6, filter F1 comprises a capacitive element C2 in parallel with a resistive element R2, between output 106 and node 108.

Various embodiments and variants have been described. Those skilled in the art will understand that certain features of these various embodiments and variants may be combined, and other variants will occur to those skilled in the art.

In particular, although examples of embodiments of device 10, of the AGC circuit, and of circuits 206 and 208 when potential Vdd is positive with respect to potential GND have been described, it will be within the abilities of those skilled in the art to adapt these examples of embodiments to the case where potential Vdd is negative by replacing NMOS transistor T1 with a PMOS transistor and, more generally, by replacing all the NMOS, respectively PMOS transistors, with PMOS, respectively NMOS, transistors.

Finally, the practical implementation of the described embodiments and variations is within the abilities of those skilled in the art based on the functional indications given hereabove. In particular, it will be within the abilities of those skilled in the art to provide other examples of implementation of circuits AGC, DET, 206, 208, 210, and 212 than those described, as an example, in relation with FIGS. 2, 3, 4, 5, and 6.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An envelope detection device comprising:
   an input terminal configured to receive an amplitude-modulated radio frequency signal;
   a first resistive element and a first metal oxide semiconductor (MOS) transistor connected in parallel between the input terminal and a first node configured to receive a reference potential;
   a first capacitive element connected between a gate of the first MOS transistor and the first node;
   an envelope detection circuit connected to the input terminal and configured to supply a voltage representative of an envelope of the amplitude-modulated radio frequency signal; and
   a control circuit for controlling the first MOS transistor configured to:
      supply a first current to the gate of the first MOS transistor only when the voltage is smaller than a first threshold; and
      draw a second current from the gate of the first MOS transistor only when the voltage is higher than a second threshold, the second threshold being higher than the first threshold.

2. The device according to claim 1, wherein a gain of the envelope detection circuit is equal to K times a square of the amplitude-modulated radio frequency signal.

3. The device according to claim 1, wherein the envelope detection circuit has a negative gain.

4. The device according to claim 1, wherein the control circuit comprises:
   a first circuit configured to supply the first current to the gate of the first MOS transistor only when the voltage is smaller than the first threshold; and
   a second circuit configured to draw the second current from the gate of the first MOS transistor only when the voltage is higher than the second threshold.

5. The device according to claim 4, wherein the second circuit is further configured to supply a third current to the gate of the first MOS transistor only when the voltage is smaller than the second threshold.

6. The device according to claim 5, wherein the third current is of the same order as the second current.

7. The device according to claim 6, wherein the third current is equal to the second current.

8. The device according to claim 5, wherein the first current is at least 10 times greater than the second current.

9. The device according to claim 5, wherein the control circuit further comprises a switch connected in parallel with the first capacitive element.

10. The device according to claim 5, wherein the first circuit comprises:
    a first differential pair having a first input configured to receive the voltage and a second input configured to receive the first threshold;
    a first current source configured to bias the first differential pair; and
    at least one first current mirror configured to supply the first current to the gate of the first MOS transistor from a current flowing through the first differential pair when the voltage is smaller than the first threshold.

11. The device according to claim 10, wherein the second circuit comprises:
    a second differential pair comprising a first input configured to receive the voltage and a second input configured to receive the second threshold;
    a second current source configured to bias the second differential pair; and
    at least one second current mirror configured to draw the second current from the gate of the first MOS transistor from a current flowing through the second differential pair when the voltage is higher than the second threshold.

12. The device according to claim 11, wherein the second circuit comprises at least one third current mirror configured to supply the third current to the gate of the first MOS transistor from the current flowing through the second differential pair when the voltage is smaller than the second threshold.

13. The device according to claim 4, wherein the first circuit comprises:
   a first differential pair having a first input configured to receive the voltage and a second input configured to receive the first threshold;
   a first current source configured to bias the first differential pair; and
   at least one first current mirror configured to supply the first current to the gate of the first MOS transistor from a current flowing through the first differential pair when the voltage is smaller than the first threshold.

14. The device according to claim 13, wherein the second circuit comprises:
   a second differential pair comprising a first input configured to receive the voltage and a second input configured to receive the second threshold,
   a second current source configured to bias the second differential pair; and
   at least one second current mirror configured to draw the second current from the gate of the first MOS transistor from a current flowing through the second differential pair when the voltage is higher than the second threshold.

15. The device according to claim 4, wherein the first current is of the same order as the second current.

16. The device according to claim 15, wherein the first current is equal to the second current.

17. The device according to claim 1, wherein the envelope detection circuit comprises:
   a second MOS transistor having a first conduction terminal coupled to the input terminal;
   a voltage source configured to apply a constant bias voltage to a gate of the second MOS transistor; and
   a second capacitive element and a second resistive element connected in parallel between a second conduction terminal of the second MOS transistor and a second node configured to receive a power supply potential.

18. The device according to claim 17, wherein the second conduction terminal of the second MOS transistor is connected to an output of the envelope detection circuit, the output being configured to supply the voltage.

19. A radio frequency receiver comprising:
   the device according to claim 1.

20. The radio frequency receiver according to claim 19, further comprising:
   an antenna for receiving the amplitude-modulated radio frequency signal; and
   an impedance matching network coupling the antenna to the input terminal of the envelope detection device.

* * * * *